(12) United States Patent
Seith

(10) Patent No.: US 9,490,681 B1
(45) Date of Patent: Nov. 8, 2016

(54) PULSED AIR TO ELECTRIC GENERATOR

(71) Applicant: INGERSOLL-RAND COMPANY, Davidson, NC (US)

(72) Inventor: Warren A. Seith, Bethleham, PA (US)

(73) Assignee: Ingersoll-Rand Company, Davidson, NC (US)

( * ) Notice: Subject to any disclaimer, the term of this patent is extended or adjusted under 35 U.S.C. 154(b) by 0 days.

(21) Appl. No.: 14/858,802

(22) Filed: Sep. 18, 2015

(51) Int. Cl.
*H02K 35/06* (2006.01)
*H02K 7/18* (2006.01)

(52) U.S. Cl.
CPC .................................. *H02K 7/1876* (2013.01)

(58) Field of Classification Search
CPC ....................................................... H02K 35/06
USPC ......................................................... 290/1 R
See application file for complete search history.

(56) References Cited

U.S. PATENT DOCUMENTS

| | | | |
|---|---|---|---|
| 2,003,647 A | | 6/1935 | Dillstrom |
| 2,895,063 A | * | 7/1959 | Morris ..................... F42C 11/04 102/207 |
| 3,555,314 A | * | 1/1971 | Villarroel ............... H02K 35/06 290/1 R |
| 3,772,541 A | * | 11/1973 | Campagnuolo ........ H02K 35/06 102/207 |
| 3,781,141 A | | 12/1973 | Schall |
| 4,403,153 A | | 9/1983 | Vallon |
| 4,581,999 A | * | 4/1986 | Campagnuolo ........... F03D 9/00 102/293 |
| 4,778,353 A | | 10/1988 | Wiernicki |
| 5,347,186 A | * | 9/1994 | Konotchick ......... H02K 7/1876 310/17 |
| 5,370,112 A | | 12/1994 | Perkins |
| 5,385,021 A | | 1/1995 | Beale |
| 6,203,288 B1 | | 3/2001 | Kottke |
| 6,283,720 B1 | | 9/2001 | Kottke |
| 6,506,030 B1 | | 1/2003 | Kottke |
| 6,588,196 B1 | | 7/2003 | Bahr |
| 6,864,647 B2 | | 3/2005 | Duncan et al. |
| 6,899,530 B2 | | 5/2005 | Lehrke et al. |
| 6,954,040 B2 | | 10/2005 | McGill et al. |
| 6,975,043 B2 | * | 12/2005 | Schumacher ........ H02K 7/1892 290/1 R |
| 7,007,453 B2 | | 3/2006 | Maisotsenko et al. |
| 7,148,583 B1 | * | 12/2006 | Shau .................... H02K 7/1876 290/1 A |
| 7,269,956 B2 | | 9/2007 | Gericke et al. |
| 7,626,289 B2 | | 12/2009 | Her |
| 8,366,414 B2 | | 2/2013 | Kaufmann et al. |
| 8,425,208 B2 | | 4/2013 | McCourt |
| 8,601,988 B2 | | 12/2013 | Graef |
| 9,004,883 B2 | | 4/2015 | Neelakantan et al. |
| 9,050,408 B2 | | 6/2015 | Rochat |
| 2010/0109331 A1 | * | 5/2010 | Hedtke .............. G05B 23/0256 290/54 |
| 2013/0309108 A1 | | 11/2013 | Haeberer |

* cited by examiner

*Primary Examiner* — Joseph Waks

(74) *Attorney, Agent, or Firm* — Sunstone IP

(57) ABSTRACT

An electric generator includes a housing with a stator positioned thereabout. A rotor (i.e., magnetic member) is positioned within the housing and is adapted to move within the housing in response to a pulsed air input, such as from a pulsed-air exhaust device. The pulsed air input creates a pressure chamber between the pulsed air input and the magnetic member, which forces the magnetic member to axially advance in a first direction through the housing to magnetically interact with the stator to generate electric current therein. A biasing member may be positioned within the housing and in operative communication with the magnetic member. The magnetic member may compress the biasing member in the first direction, but the biasing member may exert a spring-back force against the magnetic member to force the magnetic member in a second direction through the stator to magnetically interact therewith to generate additional electric current therein.

20 Claims, 3 Drawing Sheets

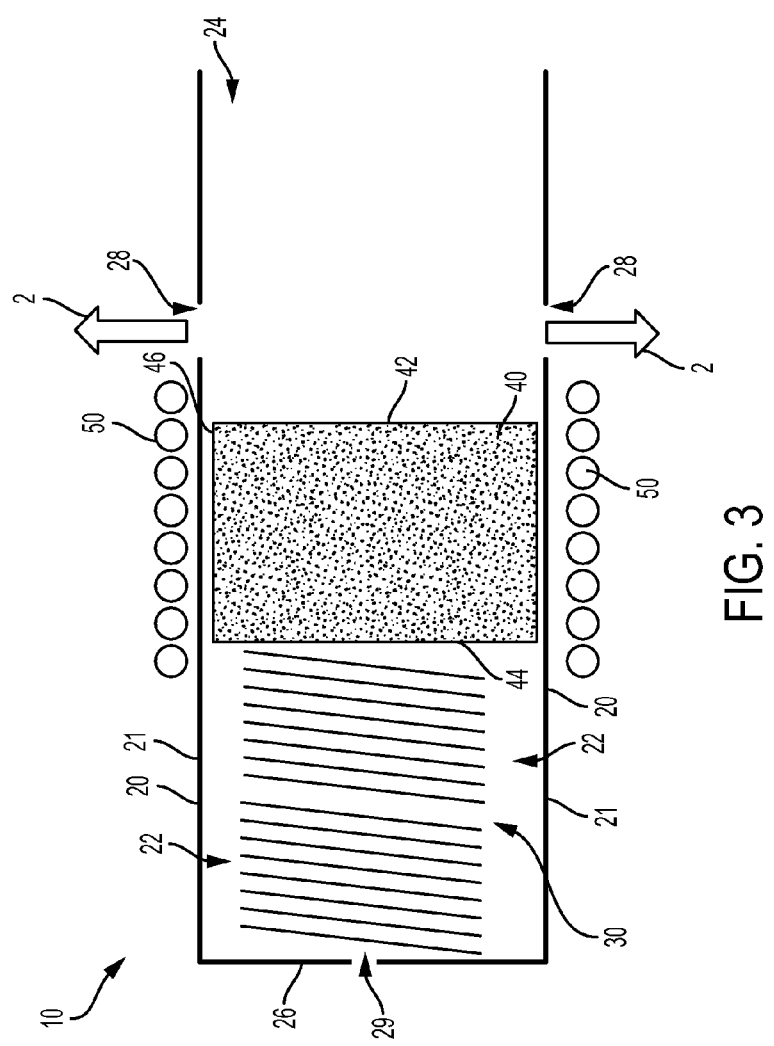

PULSED AIR TO ELECTRIC GENERATOR

BACKGROUND

Technical Field

The present disclosure relates to diaphragm pumps and other devices exhibiting pulsed air exhaust.

State of the Art

A diaphragm pump is generally described as a positive displacement pump that uses the reciprocating action of a flexible diaphragm and corresponding valves on either side of the diaphragm to pump a fluid. Pulsed air exhaust is a byproduct of the reciprocating action.

Electric power is needed to operate the electronic controls associated with these diaphragm pumps and is generally provided by electrical cabling. However, not every environment is conducive to or suitable for electrical power by cable, in which case these electronic controls on the diaphragm pump are not used.

There is thus a need to provide a means by which the electrical operations and controls of diaphragm pumps or other devices exhibiting pulsed air exhaust may be universally employed.

SUMMARY

The present disclosure relates to diaphragm pumps and other devices exhibiting pulsed air exhaust that may be converted into electric energy.

An aspect of the present disclosure includes an electric power generator comprising: a housing; a stator proximate the housing; a magnetic member in operative communication with the housing; a pulsed air input; and a biasing member in operative communication with the magnetic member; wherein the stator and the magnetic member magnetically interact to generate electrical energy by the magnetic member axially advancing from a resting position in a first direction through the stator in response to a pulsed air input and returning to the resting position in a second direction through the stator in response to the biasing member.

Another aspect of the present disclosure includes wherein the pulsed air input is exhausted from a pulsed-air exhaust device.

Another aspect of the present disclosure includes a pulsed-air exhaust device comprising: a housing; a magnetic member within the housing; a stator proximate the housing and in operative communication with the magnetic member, the magnetic member transitioning with respect to the housing in response to pulsed air exhausted from the device, the stator and magnetic member producing electrical energy; and control electronics of the device, wherein the electrical energy powers the control electronics.

Another aspect of the present disclosure includes a method of operating a pulsed air exhaust device, the method comprising: pressurizing at least a portion of a housing with pulsed air exhaust of the device; axially advancing a rotor through the housing by the pressurization; generating electricity between the rotor and a stator positioned about the housing; and operating control electronics of the device by the electricity.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members:

FIG. 3 is a cross-sectional side view of an illustrative embodiment of a pulsed air electric energy generation system in accordance with the present disclosure.

DETAILED DESCRIPTION OF EMBODIMENTS

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

The drawings depict illustrative embodiments of an electrical power generator assembly 10. These embodiments may each comprise various structural and functional components that complement one another to provide the unique functionality and performance of the assembly 10, the particular structure and function of which will be described in greater detail herein.

Figure 1:
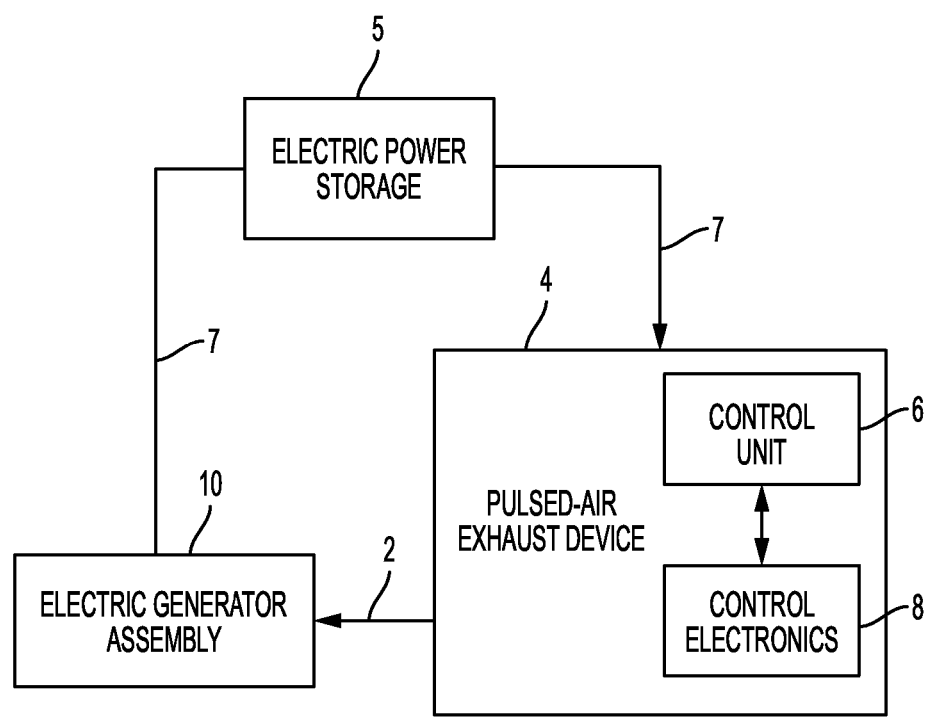
FIG. 1 is a schematic view of an illustrative embodiment of a pulsed air electric energy generation system in operative communication with a pulsed-air exhaust device in accordance with the present disclosure.
Figure 2:
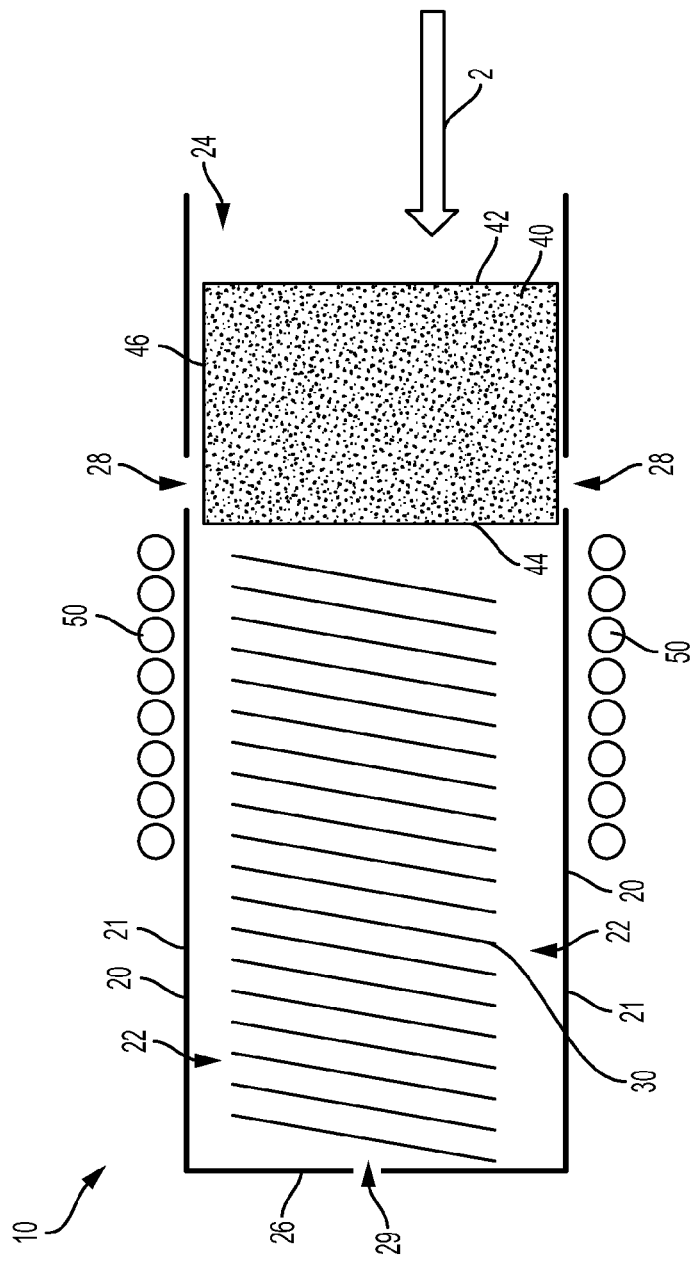
FIG. 2 is a cross-sectional side view of an illustrative embodiment of a pulsed air electric energy generation system in accordance with the present disclosure.

Referring to the drawings, FIGS. 1-3 depict an illustrative embodiment of an electrical power generator assembly 10 that may be utilized in conjunction with a source of pulsed air 2, such as from a diaphragm pump 4 or other pulsed-air operated device. For purposes of this application, specific reference to the diaphragm pump 4 may refer also to any other pulsed-air operated device. Embodiments of the assembly 10 may comprise the pulsed air 2 being compressed air that is regularly, repeatedly, and/or intermittently discharged from a diaphragm pump 4 or other pulsed-air exhaust device. For example, an embodiment of the diaphragm pump 4 may include two chambers, each chamber having a flexible diaphragm, an inlet check valve and an outlet check valve that operate to pump a fluid. The inlet check valves and an outlet check valves may be ball valves, flap valves, or other similar valves that open and close alternately to fill chambers and block back flow. The diaphragms may be coupled together by a rod, such that the diaphragms may move in oppositional harmony. The diaphragms may be actuated by a compressed air supply that is shifted by components of the pump 4 from one chamber to another with an air spool valve that is built into the pump 4, wherein the compressed air presses against the respective diaphragms and causes each to flex. As the diaphragms flex, the first diaphragm may flex to decrease the volume of the first chamber and force liquid out of its outlet check valve and into the discharge piping while at the same time the second diaphragm may flex to increase the volume of the second chamber so that it fills with liquid through its inlet check valve. The process may then be reversed and the compressed air may cause the diaphragms to flex in the opposite direction so that the second diaphragm flexes to decrease the volume of the second chamber and force liquid out of its outlet check valve and into the discharge piping while at the same time the first diaphragm flexes to increase the volume of the first chamber so that it fills with liquid through its inlet check valve. This cycle may thereafter be repeated as needed or desired to establish a repetitive pumping effect of a fluid through the pump 4. The compressed air that actuates the diaphragms may be discharged from the pump 4 through an exhaust port or the like, and the reciprocating nature of the pump 4 may cause pulsation of the discharge air flow.

With reference to FIG. 1, embodiments of the diaphragm pump 4 or pulsed-air exhaust device (may be used herein interchangeably with the diaphragm pump 4) may comprise a control unit 6 and associated control electronics 8. For example, the control unit 6 may be a controller comprising a processor (CPU), circuit board, internal memory, software, control algorithms, inputs, outputs, and other electrical components as needed to direct the electrical operations of the pump 4. Further in example, the associated control electronics 8 may further comprise sensors, gauges, valves, regulators, transducers, solenoids, controllers, wireless communications, and the like for measuring and controlling gas and/or liquid flow through the pump 4, counting pump cycles, detecting leaks, measuring and sensing end of stroke, offsetting the stroke length, and balancing the gas and liquid flow through the pump 4, among other important electrically-based operational and control aspects of the pump 4. The control unit 6 may be configured to coordinate the operations of each component of the control electronics 8. Alternatively, each of the components of the control electronics 8 may be configured to communicate directly with one or more corresponding components, as needed, to perform the desired operations of the pump 4. Further in the alternative, each of the components of the control electronics 8 may be configured to communicate with the control unit 6 as well as directly with one or more corresponding components, as needed, to perform the desired operations of the pump 4.

With regard to FIGS. 1 and 2, embodiments of the assembly 10 may further comprise a housing 20. The housing 20 may be operatively coupled to the diaphragm pump 4, and in some embodiments the housing 20 may be coupled to or at least positioned proximately to the exhaust port of the diaphragm pump 4. The housing 20 may have an elongate shape with sidewalls 21 running along an axial length between a first end 24 and a second end 26. The first end 24 may be an open end or a partially-closed end. The second end 26 may be a closed end. The housing 20 may comprise an interior defined by the sidewalls 21 and the first and second ends 24 and 26. In certain embodiments of the assembly 10, the interior portion 22 may be defined as a cylindrical bore having a diameter and an axis. The housing 20 may further comprise one or more ports 28 therein. The one or more ports 28 may be positioned in one or more of the sidewalls 21 of the housing 20. The one or more ports 28 may be configured to permit fluidic communication between the interior portion 22 of the housing 20 and the ambient air.

The housing 20 may further comprise a bleed port 29 configured in or near the second end 26 of the housing 20.

Embodiments of the assembly 10 may further comprise a biasing member 30. The biasing member 30 may be a compressible, elastic or flexible member capable of compressing in length, to store potential energy therein, in response to force acting thereon. For example, the biasing member 30 may be a spring-like member, such as a coiled spring, helical spring, conical spring, or compression coil spring. The biasing member 30 may be configured of a size and shape to be inserted within the interior portion 22 of the housing 20. The biasing member 30 may be positioned in the interior portion 22 such that a portion of the biasing member 30 may engage the second end 26 of the housing 20 and exert force thereon, or vice versa, under the condition force is exerted on the biasing member 30 to compress the biasing member 30. The biasing member 30 may be configured of a size and shape to permit fluid, such as air, to pass therethrough and within the interior portion 22 with little or no resistance.

Embodiments of the assembly 10 may further comprise a magnet structure 40. The magnet structure 40 may be comprised of one or more magnet components. The magnet structure 40 may be comprised of a first face 42 and a second face 44 with a length therebetween. The magnet structure 40 may further comprise an exterior surface 46 running between the first and second faces 42 and 44. The magnet structure 40 may be of a size and shape to be inserted within the interior portion 22 of the housing 20. For example, the exterior surface 46 of the magnet structure 40 may have a cylindrical shape that corresponds with the cylindrically-shaped bore of the interior portion 22 of the housing 20. The exterior surface 46 of the magnet structure 40 may be configured to contact the interior surfaces of the interior portion 22 of the housing 20, such that a hermetic seal, or substantially airtight seal, is established between the magnet structure 40 and the interior portion 22. Embodiments of the assembly 10 may further comprise a friction reducer, such as a lubricant, for example, being positioned between the exterior surface 46 of the magnet structure 40 and the interior surfaces of the interior portion 22 to facilitate movement of the magnet structure 40 with respect to the housing 20.

Embodiments of the assembly 10 may further comprise a stator 50. The stator 50 may comprise one or more electric conductors, such as metal coils, positioned about the housing 20, such that the stator 50 may operatively communicate with the magnet structure 40 to create electric energy. In other words, the stator 50 may be the stationary component and the magnetic structure 40 may be the moving component of an electric generator that may work together to cause relative movement between the respective magnetic and electric fields, which in turn may generate electricity 7 for use by the diaphragm pump 4. For example, as the magnetic structure 40 translates back and forth within the interior portion 22 of the housing 20, as described herein, the magnetic structure 40 may generate a moving magnetic field, which may induce a voltage difference between the electric conductors of the stator 50 that may produce the alternating current (AC) output of the assembly 10. The AC output may thereafter be converted to DC supply and stored in an electrical power storage device 5, such as a battery. The electrical power storage device 5 may be configured to receive and store sufficient electrical energy to provide electric power to the control unit 6 and control electronics 8 of the diaphragm pump 4.

With regard to the electrical power generation of the assembly 10, as disclosed herein, embodiments of the assembly 10 may further comprise the magnet structure 40 being positioned in the interior portion 22 such that at least a portion of the magnet structure 40 may cover, block, conceal, or otherwise shield the one or more ports 28 in the housing 20, as exemplarily depicted in FIG. 2. With the ports 28 shielded in this way, the magnetic structure 40 may be considered to be in a first, resting or initial position within the housing 20. The magnet structure 40 may also be positioned in the interior portion 22 such that at least a portion of the magnet structure 40 may engage the biasing member 30 to potentially exert force thereon, or vice versa, under the condition force is exerted on the magnet structure 40. In particular, a portion of the second face 44 of the magnet structure 40 may be configured to engage a portion of the biasing member 30 to exert force on the biasing member 30 as force is exerted on the first face 42 of the magnet structure 40 to axially displace, or otherwise transition, the magnet structure 40 within the interior portion 22 of the housing 20. In this way, the magnet structure 40 may be adapted to move within the housing 20 in response to forces acting thereon and engage the biasing member 30 in the process.

With further regard to the electrical power generation of the assembly 10, embodiments of the assembly 10 may comprise the magnet structure 40 being configured to move or axially transition within the housing 20 in response to the pulsed air 2. The first end 24 of the housing 20 may be configured to receive the pressurized pulsed air 2 from the exhaust port of the diaphragm pump 4, or other pulsed-air operated device. The pulsed air 2 may serve to increase the pressure within the interior portion 22 of the housing 20 between the exhaust port and the first face 42 of the magnet structure 40. The housing 20 may be positioned in close enough proximity to the exhaust port of the diaphragm pump 4 so that the pulsed air 2 from the exhaust port may have sufficient enough pressure and energy to actuate the magnet structure 40 within the housing 20. For example, the magnet structure 40 and the housing 20 may be configured so that as the pulsed air 2 exits the exhaust port of the diaphragm pump 4 the pulsed air 2 creates an effective pressure chamber within the housing 20 between the exhaust port and the first face 42 of the magnet structure 40. The elevated pressure within the pressure chamber created by the pulsed air 2 may serve to accelerate the magnet structure 40 within the interior portion 22 to axially transition the magnet structure 40 in a first direction toward the second face 26 of the housing 20.

As the magnet structure 40 advances through the interior portion 22 of the housing 20, the magnet structure 40 may engage the biasing member 30 to compress the biasing member 30, as described herein. During the movement of the magnet structure 40 from the initial or first position, the resistance to compression exhibited by the biasing member 30 may be minimal (i.e., minimal return spring force), thus permitting the magnet structure 40 to readily axially advance along the interior portion 22 toward the second end 26. Moreover, any air between the magnet structure 40 and the second end 26 of the housing 20, or in and around the biasing member 30, may exit the housing 20 through the bleed port 29 in the second end 26 of the housing 20 as the biasing member 30 is compressed, thus reducing or eliminating any fluid resistance that may otherwise act on the second face 46 of the magnet structure 40. Further still, the magnetic interaction between the magnetic structure 40 and the stator 50 is minimal, if there is any, as the magnetic structure 40 begins to axially advance within the interior portion 22 of the housing 20 toward the second end 26. Thus, the initial acceleration of the magnetic structure 40 may be suitable to permit the magnetic structure 40 to reach a velocity that is sufficient to adequately compress the biasing member 30 to store potential energy therein, as well as allow the magnetic structure 40 pass through the stator 50 to magnetically interact therewith to create the electric current therein.

As the magnet structure 40 is accelerated away from the first or initial position and toward the second end 36 of the housing, the magnet structure 40 may perform its intended purpose and thereafter begin to decelerate. For example, as the magnet structure 40 axially transitions through the interior portion 22 of the housing 20, the magnet structure 40 may pass through the stator 50 to magnetically interact therewith to create electric current therein. As a result, the magnetic interaction between the magnetic structure 40 and the stator 50 may begin to increase while at the same time causing the magnetic structure 40 to potentially decelerate. Moreover, as the magnetic structure 40 axially advances through the housing 20, the ports 28 in the housing 20 may be revealed, exposed or otherwise uncovered, as exemplarily depicted in FIG. 3. With the ports 28 open, the pulsed air 2 within the interior portion 22 may begin to escape to the ambient air. As such, the pulsed air 2, which had been applying pressure on the first face 42 of the magnetic structure 40 to accelerate the magnetic structure 40 toward the second end 26 to thereby compress the biasing member 30 therebetween and pass through the stator 50, may escape or release through the ports 28, thus reducing, diminishing, or otherwise removing the pressure and force acting upon the first face 42. With the backpressure removed from behind the first face 42, the magnetic structure 40 may begin to decelerate. Further, as the biasing member 30 is further compressed, the biasing member's 30 resistance to compression may increase, thus exerting greater and greater force against the second face 46 of the magnet structure 40 to cause the magnetic structure 40 to decelerate.

Having passed through the stator 50 in a first direction (i.e., toward the second end 26) and with diminishing pressure being exerted on the first face 42 and increased compressive (i.e., spring-back) force being applied by the biasing member 30 on the second face 44, the magnetic structure 40 may stop and reverse course within the housing 20. For example, the configuration of the biasing member 30 within the housing 20 may cause the biasing member 30 to compress enough to store sufficient compressive force against the second face 46 of the magnet structure 40 to first decelerate the magnetic structure 40 and then cause the magnetic structure 40 to reverse course and axially advance in a second direction back toward the first or initial position (i.e., toward the first end 24). Indeed, the biasing member 30 may act to exert spring-back force against the second face 44 to axially advance the magnetic structure 40 back through the stator 50 (i.e., in the second direction) and toward the first end 24 of the housing 20. By passing back through the stator 50 in the second direction, the magnet structure 40 may again magnetically interact with the stator 50 to create additional electric current therein.

With the configuration of the biasing member 30 within the housing 20 and the exhausting of the pulsed air 2 from the housing 20 by way of the ports 28, the magnet structure 40 may be configured to return to the first or initial position, ready to repeat the cycle or stroke. In the first or initial position, the magnet structure 40 may again cover, conceal, or block the one or more ports 28 from exposure to the pulsed air 2. Thus, as the diaphragm pump 4 releases another or subsequent burst of pulsed air 2 through the exhaust port, the magnet structure 40 is appropriately positioned to be accelerated thereby back through the interior portion 22 of the housing 20, as described herein. In this way, the magnetic structure 40 may be configured to repeatedly pass back and forth through the stator 50 to magnetically interact therewith to create electric current therein.

Embodiments of the assembly 10 may further comprise a muffler, noise dampener or pulsation dampener (not depicted). The pulsation dampener may be muffling or sound-reduction material designed to reduce the noise that may be a result of the pulsating air exhausting from the exhaust port of the pump 4. The muffling material may be configured on the housing 20 in proximity to the ports 28. As such, the pulsed air 2 exiting the housing 20 through any of the ports 28 may pass through the pulsation dampener to reduce the noise created by the pulsed air 2. The pulsation dampener may be adjustable to permit different flow volumes of pulsed air 2 there through. In other words, the pulsation dampener of the assembly 10 may allow greater volumes of pulsed air 2 to pass there through without much noise reduction or may restrict the volume of pulsed air 2 to pass there through with greater levels of noise removed from the pulsed air 2. With less restriction of the flow of the pulsed air 2 through the ports 28 and the pulsation dampener, the pressure in the housing 20 may be quickly adjusted, attuned, reduced or diminished. With less pressure in the pressure chamber of the housing 20, the assembly 10 may produce less electrical power. Conversely, with more restriction of the flow of the pulsed air 2 through the ports 28 and the pulsation dampener, the pressure in the housing 20 may be maintained, preserved, upheld. With more pressure in the pressure chamber of the housing 20, the assembly 10 may be able to produce more electrical power.

Embodiments of the assembly 10 may comprise the ports 28 being configured in the housing 20 at various positions. For example, one or more ports 28 may be positioned a first length from the first or second ends 24 and 26 of the housing 20, whereas another port 28 may be positioned a second length from the first or second ends 24 and 26 of the housing 20. This may permit the assembly 10 to maintain pressure within the housing 20 for a longer period of time or for a longer stroke length of the magnet structure 40. Alternatively, each of the ports 28 may be positioned a first length from the first or second ends 24 and 26 of the housing 20. This may permit greater control of the acceleration and velocity of the magnet structure 40 due to the pulsed air 2 being able to exit the housing 20 at an axial point. The ports 28 may be positioned closer to the first end 24 than the second end 26. The ports 28 may be positioned closer to the first end 24 than the stator 50. The portion of the housing 20 between the ports 28 and the first end 24 may be considered a pressure chamber, wherein the pulsed air 2 increases the pressure within the pressure chamber when the pulsed air 2 is introduced into the housing 20 via the first end 24. As such, the magnet structure 40 may accelerate in the housing 20 until the first face 42 of the magnet structure 40 passes by the ports 28 to expose the ports 28 to the pulsed air 2, at which time the pulsed air 2 exits the housing 20 and the pressure in the pressure chamber begins to reduce. The magnet structure 40 may have a resting, first, or initial position within the housing 20 where at least the first face 42 of the magnet structure 40 closes or covers the ports 28, such that the pulsed air 2 may create sufficient pressure to accelerate the magnet structure 40 toward the second end 26. Alternatively, the resting position of the magnet structure 40 may be closer toward the first end 24 of the housing 20. In this way, the stroke of the magnet structure 40 may be greater or longer, which may allow the magnet structure 40 to achieve greater acceleration and velocity to generate greater electric current through the stator 50. The resting position of the magnet structure 40, as well as the position and size of the ports 28 may be adjusted to maximize or optimize performance of the assembly 10.

Embodiments of the assembly 10 may therefore be adapted to extract energy from the pulsed air 2 exhausted from the diaphragm pump 4 and convert the energy to electrical power that may thereafter operate the electrical operations of the pump 4. As such, the assembly 10 may permit the electronic functions of the diaphragm pump 4 to operate by electric power produced and stored locally, instead of from electric power provided by a power cable connected to an external electrical source.

Embodiments of the assembly 10 may further comprise a control algorithm that may operate in conjunction with the control unit 6 to manipulate and manage the control electronics 8 of the pump 4, as well as the electric power generation capabilities of the assembly 10. The control algorithm may be stored in the control unit 6 and operate to control the various electronically adjustable parameters and performance characteristics of the assembly 10 and the diaphragm pump 4 based on operational demand required of the pump 4, user input provided to the pump 4, and/or feedback received from various control electronics 8 positioned throughout the pump 4.

For example, embodiments of the assembly 10 may further comprise adjusting control parameters of the energy production of the stator 50 and/or optimizing the control electronics 8 to maximize the electric storage levels of the battery(s) 5 or capacitors associated with the electric circuit. The assembly 10 may further comprise diodes being utilized to restrict current flow through the stator 50 when the magnet structure 40 is axially advancing through the stator 50 in the first direction toward the second face 26. In this way, more of the energy from the velocity/momentum of the magnet structure 40 may be stored in the compression of the biasing member 30 versus being passed to the stator 50. This may serve to allow the pump 4 (i.e., control unit 6) to adjust the production of electric energy from the assembly 10 as needed based on demand or performance requirements. Further in example, embodiments of the assembly 10 may further comprise the control algorithm communicating with the interior portion 22 of the housing 22, the ports 28, and the pulsation dampener to adjust the pulsation dampener to adjust the volume of pulsed air 2 passing there through. When more electric energy is needed, the control algorithm may instruct the pulsation dampener to restrict the flow of the pulsed air 2 there through to maintain higher pressures within the housing 20 to increase the energy transferred to the magnet structure (i.e., acceleration and velocity), which may thereby be transferred to the stator 50 to generate more electric energy. Conversely, when less electric energy is needed, the control algorithm may instruct the pulsation dampener to permit increased flow of the pulsed air 2 there through to reduce the pressure within the housing 20 to decrease the energy transferred to the magnet structure (i.e., acceleration and velocity), which may thereby reduce the energy transferred to the stator 50 to generate less electric energy. This may be the case when electrical storage reserves in the electrical power storage device 5 are sufficient. Further yet, sensors, such as a pressure transducer, may be positioned within the housing 20 to sense operational parameters of the assembly 10 to provide feedback to the control unit 6. Based on the received feedback, the control unit 6 may be able to anticipate operations of the pump 4 and thereby optimize the readiness of the assembly 10 through other various control electronics to generate electric power.

Embodiments of the assembly 10 may further comprise the housing 20 having a curvilinear shape, wherein the magnet structure 40 may swing on a pivot and translate within the curvilinear shape. The translation of the magnet structure 40 within the curvilinear shape may operate similarly to the operation and performance of the magnet structure 40 in the linear embodiment described herein. In the curvilinear shape, the corresponding stator 50 may be positioned about the housing 20 to magnetically communicate with the magnet structure 40 as the magnet structure 40 translates within the curvilinear housing 20. Moreover, embodiments of the assembly 10 may further comprise the housing 20 having a rotary shape, wherein the magnet structure 40 may rotate about an axis having bearings that reduce friction.

The materials of construction of the assembly 10 and its various component parts, including embodiments of the housing 20, may be formed of any of many different types of materials or combinations thereof that can readily be formed into shaped objects provided that the components selected are consistent with the intended operation of power tools and security lock-out devices of the type disclosed herein. For example, and not limited thereto, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining the above-described assembly 10 and its various component parts, including embodiments of the housing 20, may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, 3-D printing, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. An electric power generator comprising:
   a housing;
   a stator proximate the housing;
   a magnetic member in operative communication with the housing;
   a pulsed air input; and
   a biasing member in operative communication with the magnetic member;
   wherein the stator and the magnetic member magnetically interact to generate electrical energy by the magnetic member axially advancing from a resting position in a first direction through the stator in response to a pulsed air input and returning to the resting position in a second direction through the stator in response to the biasing member.

2. The generator of claim 1, wherein the pulsed air input is exhausted from a pulsed-air exhaust device.

3. The generator of claim 1, wherein the magnetic member exhibits back-and-forth linear movement.

4. The generator of claim 1, wherein a shape of the magnetic member corresponds to a shape of the housing to establish a substantially air-tight seal therebetween.

5. The generator of claim 4, wherein the pulsed air input creates pressure in the housing between the pulsed air input and the magnetic member to axially advance the magnetic member in the first direction.

6. The generator of claim 1, wherein the biasing member is positioned within the housing and wherein the magnetic member transitioning in the first direction compresses the biasing member between the magnetic member and the housing.

7. The generator of claim 1, wherein the compressed biasing member exerts force against the magnetic member to axially advance the magnetic member in the second direction.

8. The generator of claim 1, further comprising one or more ports in the housing, the ports being in fluidic communication with ambient air.

9. The generator of claim 8, wherein the ports are covered when the magnetic member is in the resting position and the ports are exposed when the magnetic member moves from the resting position.

10. The generator of claim 9, wherein the pulsed air input exhausts out of the ports.

11. The generator of claim 1, further comprising a battery in electrical communication with the stator, wherein the battery receives electric energy from the stator.

12. The generator of claim 11, wherein the battery electrically powers a pulsed air exhaust device.

13. A pulsed-air exhaust device comprising:
    a housing;
    a magnetic member within the housing;
    a stator proximate the housing and in operative communication with the magnetic member, the magnetic member transitioning with respect to the housing in response to pulsed air exhausted from the device, the stator and magnetic member producing electrical energy; and control electronics of the device, wherein the electrical energy powers the control electronics.

14. The device of claim 13, wherein the magnetic member axially transitions within the housing from a first position in response to the pulsed air.

15. The device of claim 14, further comprising a biasing member positioned within the housing and in operative communication with the magnetic member, wherein the magnetic member transitions back to the first position in response to the biasing member.

16. The device of claim 15, wherein the magnetic member transitioning to and from the first position causes the magnetic member to pass back and forth through the stator to produce the electric energy.

17. The device of claim 14, further comprising one or more ports in the housing, wherein the ports are in fluidic communication with ambient air, and wherein the ports are closed with the magnetic member in the first position and the ports are opened when the magnetic member transitions from the first position.

18. The pump of claim 17, wherein a portion of the pulsed air exits the housing to the ambient air through the one or more open ports.

19. A method of operating a pulsed air exhaust device, the method comprising:

pressurizing at least a portion of a housing with pulsed air exhaust of the device;

axially advancing a rotor through the housing by the pressurization;

generating electricity between the rotor and a stator positioned about the housing; and operating control electronics of the device by the electricity.

20. The method of claim 19, further comprising storing the electricity.

* * * * *